United States Patent [19]
Bartholomew

[11] Patent Number: 5,582,436
[45] Date of Patent: Dec. 10, 1996

[54] APPARATUS FOR ATTACHING HOSES AND TUBES TO A FITTING

[75] Inventor: Donald D. Bartholomew, Marine City, Mich.

[73] Assignee: Proprietary Technology, Inc., Bloomfield Hills, Mich.

[21] Appl. No.: 476,224

[22] Filed: Jun. 7, 1995

Related U.S. Application Data

[62] Division of Ser. No. 335,541, Nov. 7, 1994, which is a division of Ser. No. 776,824, Oct. 15, 1991, Pat. No. 5,388,870, which is a division of Ser. No. 504,543, Apr. 4, 1990, Pat. No. 5,261,706, which is a division of Ser. No. 265,263, Oct. 31, 1988, Pat. No. 4,923,226, which is a continuation-in-part of Ser. No. 189,395, May 2, 1988, abandoned, which is a continuation-in-part of Ser. No. 066,749, Jun. 23, 1987, abandoned.

[51] Int. Cl.⁶ ..................................................... F16L 33/22
[52] U.S. Cl. ............................................. 285/242; 285/255
[58] Field of Search .................................. 285/242, 255, 285/351, 903, 906, 908, 917

[56] References Cited

U.S. PATENT DOCUMENTS

| | | | |
|---|---|---|---|
| 756,350 | 4/1904 | Gorbutt | 285/255 |
| 3,361,449 | 1/1968 | Parro | 285/255 X |
| 3,695,632 | 10/1972 | Kruse et al. | 285/255 X |
| 3,741,238 | 6/1973 | Laley | 285/255 X |
| 4,178,021 | 12/1979 | Lauro et al. | 285/255 |
| 4,238,132 | 12/1980 | Palmaer | 285/255 X |
| 4,564,222 | 1/1986 | Loker et al. | 285/255 |
| 4,923,226 | 5/1990 | Bartholomew | 285/242 |
| 5,388,870 | 2/1985 | Bartholomew | 285/242 |

FOREIGN PATENT DOCUMENTS

| | | | |
|---|---|---|---|
| 121283 | 3/1946 | Australia | 285/255 |
| 210559 | 3/1956 | Australia | 285/242 |
| 210848 | 3/1956 | Australia | 285/255 |
| 259048 | 11/1963 | Australia | 285/255 |
| 687700 | 8/1930 | France | 285/242 |
| 1085009 | 1/1955 | France | 285/242 |
| 1211974 | 3/1960 | France | 285/255 |
| 2149136 | 4/1972 | Germany | 285/255 |
| 2716290 | 10/1978 | Germany | 285/255 |
| 27183 | 2/1933 | Netherlands . | |
| 194818 | 3/1938 | Switzerland . | |
| 1431227 | 4/1976 | United Kingdom | 285/255 |

*Primary Examiner*—Dave W. Arola
*Attorney, Agent, or Firm*—Harness, Dickey & Pierce

[57] ABSTRACT

A hose coupling for use with flexible hose comprises a biconical fitting which is inserted into a hose end and a frusto-conical locking sleeve located about the hose portion which grips the rearward conical section of the fitting. Sealing arrangements for specific embodiments of hose are disclosed. The double included angle of the conical portion of the sleeve and fitting, which engages the hose, is between one degree but less than ten degrees.

11 Claims, 5 Drawing Sheets

APPARATUS FOR ATTACHING HOSES AND TUBES TO A FITTING

This is a division of U.S. patent application Ser. No. 08/335,541 filed Nov. 7, 1994; which was a divisional of Ser. No. 07/776,824 filed Oct. 15, 1991, now issued as U.S. Pat. No. 5,388,870; which was a divisional of Ser. No. 07/504,543 filed Apr. 4, 1990, now issued as U.S. Pat. No. 5,261,706; which was a divisional of Ser. No. 07/265,263 filed Oct. 31, 1988, now issued as U.S. Pat. No. 4,923,226; which was a continuation-in-part of Ser. No. 07/189,395 filed May 2, 1988, now abandoned; which was a continuation-in-part of Ser. No. 07/066,749 filed Jun. 23, 1987, now abandoned.

BACKGROUND AND SUMMARY OF THE INVENTION

This invention relates to a method and apparatus for attaching hoses and tubes to a fitting and more particularly to a specially configured, hand assembled, tube coupling and apparatus.

Attaching hoses and tubes to fittings to form a reliable fluid-tight coupling has presented problems over the years. Two basic problems are axial pull off (separation of the hose from the fitting) and pressure or vacuum sealing of a confined media. Hose clamps, crimped on ferrules, and attachments that screw on and in the hose can provide an effective method of terminating a hose but they can be complex, expensive to manufacture, and involve special tools to assemble.

A fitting having both conical and double-conical shapes (i.e., diamond shaped) in combination with a frusto-conical locking sleeve have been used to terminate a hose. Generally, the hose is thrust over the large diameter of the cone and seated about the reverse tapered portion thereof. For one reason or another this type of hose coupling has not been totally reliable and this is not generally used commercially. For example, to resist axial pull off prior, terminations have made the angle of the reverse taper greater than needed. When a hose is thick or its material is stiff and unyielding, advancing the outer sleeve by hand is so difficult that the result is inadequate pressure exerted on the hose by the outer sleeve.

To improve the hose connection utilizing the double conical fitting, it has been believed by others in the art that special arrangements are required for driving the sleeve relative to the fitting. Deutsches Reich 424980 (1926) provides a spring for driving an interiorly threaded sleeve onto the hose. These threads are at a different taper than that of the sleeve or fitting and bite into the outside of the hose to compress the sleeve about the hose and the hose about the fitting, thereby retarding loosening or pull-off of the hose from the fitting. Dutch Patent No. 27183 (1932) provides a coupling nut which is threadably advanced about the sleeve in a direction that drives the outer sleeve up onto the fitting and about the hose to increase the pressure between the hose and fitting.

The angle range is particularly important because the mechanical advantage of the sleeve capability decreases with increasing angle. When one uses a separate driving nut, one only has the mechanical advantage of the thread at initial installation or retightening.

It would be desirable to provide a coupling wherein a threadless outer sleeve could be easily set or engaged by hand, thereby eliminating the possible need for torquing the outer sleeve. With a proper angle range only very rudimentary means of preventing tube or hose "push back" or sleeve securement are required.

Accordingly, there is provided herein a hose coupling for terminating the end of a deformable hose or tubular member, which coupling includes a tubular fitting having an exterior surface and adapted to be received interiorly of the hose and a frusto-conical locking sleeve having an interior surface and adapted to be circumposed about the hose whereby the hose is clampingly secured between the surfaces of the fitting and sleeve. Further, the fitting includes a forwardly extending frusto-conical portion which defines a lead-on area at the end of the fitting. In particular, the hose engaging surfaces are frusto-conical with the angles defining each cone being limited to a narrow specified range. In accordance with this invention the frusto-conical surfaces are defined by a taper angle of between ½ degree to 4 degrees per side relative to the fitting axis. (i.e., the frusto-conical surfaces define a 1° to 8° double included angle.)

The prior art fails to recognize that the included conical angle of the hose engaging surfaces be small and be from about ½ degree per side to 4 degrees per side. Unexpectedly, this specific angle range produces locking and sealing results that are so outstanding that threads and springs, etc., are not necessary for the same reliability. Selection of the special angle range resists any relative movement of between the sleeve, hose, and fitting that could loosen the mechanical lock on the reverse taper or disrupt the pressure sealing integrity of the attachment. A fitting so configured allows the use of an outer sleeve that is very simple, requires only minimal force to compress the hose about the fitting, and is spaced away from the hose sealing area yet provides an additional locking of the hose to the exterior of the fitting. All of this may be accomplished by hand setting of the outer sleeve.

It is believed that if the angle defining the frusto-conical sealing portion is greater than the above-noted specific range, very minor distortions of wall thickness will result in greater loss of sealing. Since the reliability of the attachment is also determined by how well it seals over time, angles larger than those specified herein are believed to cause a more rapid deterioration of sealing. Also, these larger angles require more distortion of the hose or tube material by what is termed secondary locking means that are incorporated on the inner member. The more rapid deterioration of the tube or hose material that results also contributes to rapid loss of sealing.

Further, in accordance with this invention, there are disclosed intermediate adapter elements between the locking sleeve and hose and/or between the hose and fitting. Specific of these elements are not wedge shaped but are also defined on their interior and exterior surfaces by the same double included angle of between 1 and 8 degrees, whereby to follow the respective interior surface of the locking sleeve or exterior surface of the fitting. The purpose of these adapter elements is to distribute stresses and assist in sealing, each typically being of a suitable elastomer. An advantage of reducing stresses is an increase in hose life.

Accordingly, there is provided herein a hose coupling including a frusto-conical fitting and sleeve lock which cooperate to resist pull off as well as having (a) resistance to the temperature caused changes that result in loosening or leaks, (b) resistance to the vibration caused changes that result in loosening or leaks, and (c) resistance to mechanical forces that push on the tube or hose in a manner that "unlocks" the sleeve lock, or encourages leaking.

The interaction of all these factors generally stems from the fact that the hose or tube is spring like, and depending on its mass and/or deformation recovery characteristics, the hose or tube will exhibit resonances of mechanical motion. One component of this mechanical movement are forces developed in an axial direction which tend to unlock this type of attachment. Temperature effects affect the resistance to these and other unlocking mechanical forces.

Advantageously, the specially configured outer sleeve fitting provide a low cost coupling, and the labor expended in "setting" the outer sleeve is definitely lower cost than setting clamps, crimping ferrules, or screw-over type attachments used in some cases to replace crimped ferrules.

A variety of different types of pressure or vacuum confining conduits are shown and described herein. The foregoing and other advantages will become more apparent when viewed in light of the accompanying drawings and the following detailed description wherein:

DETAILED DESCRIPTION OF THE PREFERRED EMBODIMENT

Figure 1:
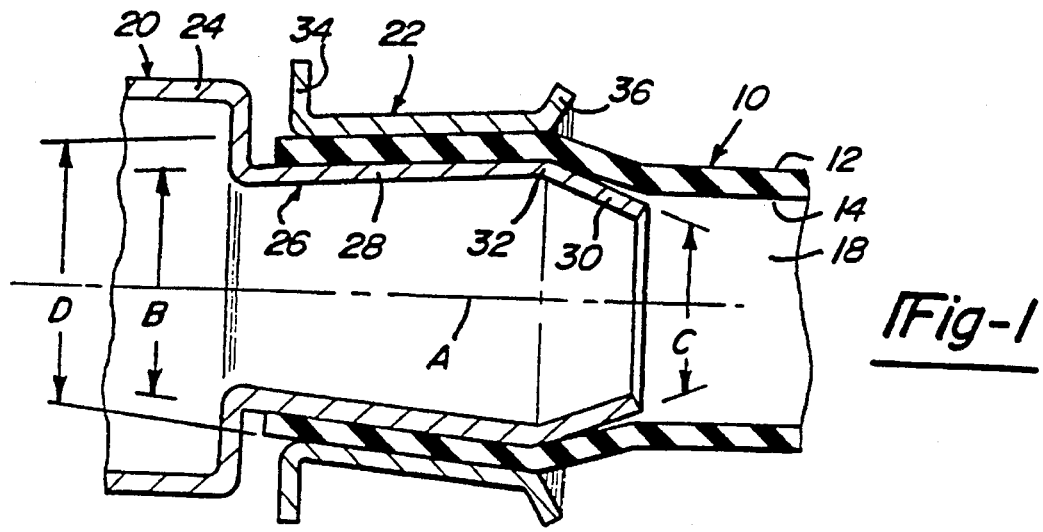
FIG. 1 is a side elevation view in cross-section of a fluid-tight coupling comprising a hose clamped by a sleeve about a tubular fitting.

Turning now to the drawings, FIGS. 1–12 show fluid couplings each generally comprising a biconical fitting, a locking sleeve disposed about the fitting and at least one tubular hose or conduit 10 clampingly secured to the fitting by the sleeve. The forward end portion of hose 10 is pushed onto a frusto-conical lead on entry defining an open end of the fitting, over a crest and onto a reverse frusto-conical portion and held thereto by the clamping or gripping action of the outer sleeve. Various embodiments of hose connections and gripping arrangements are disclosed herein.

The tubing or hose 10 is representative of single or multiple wall, reinforced, or not-reinforced generally routable, not rigid metal, construction for use in fluid installations, such as hydraulic or pneumatic equipment. Hose 10 consists of a material that is deformable to an extent, but not (or only slightly) compressible. In other words, not a foam which is compressible because of its porosity or trapped gas which is compressible. Hose 10 is generally axially extending having concentric outer and inner surfaces 12 and 14 and a forward end 16 cut square, the inner surface defining a central bore 18 to confine and pass the fluid.

FIG. 1 shows a fluid coupling formed along an axis "A" wherein the forward end portion of hose 10 is coaxially sandwiched between generally axially extending tubular fitting 20 and outer lock sleeve 22. Fitting 20 has an axial bore extending therethrough and generally comprises a cylindrical body member 24 from which a hose terminating biconical portion 26 extends, the biconical portion including a first and a second end portion 28 and 30, each end portion being generally frusto-conically shaped. The respective exterior surfaces of portions 32 and 34 are conical and defined by a double included angle "B" and "C" relative to axis "A" and intersect at a crest 32 defining the largest diameter portion which expands the hose. Generally, cylindrical body member 24 is a portion of some device such as a rigid pipe, a fluid connector, or some attachment which passes the fluid confined by hose 10. End portion 30 defines a lead-on area for receiving the and expanding the hose end portion and end portion 28 defines a reverse taper surface for the hose to grip. Fitting 20 would preferably be constructed of rigid material, so as to resist diametric reduction during the life of the attachment such as steel, brass or an oriented organic fiber.

Outer sleeve 22 is generally frusto-conical in cross-section and its interior wall is conical for gripping the hose exterior and is formed by a double included angle "D" relative to axis "A". Sleeve 22 includes forward and rearward end portions 34 and 36 at its opposite ends. Rearward end portion 34 defines a radial flange 34 extending radially outward from the sleeve to assist the user in coaxially driving the outer sleeve relative to hose 10 and body portion 28 of fitting 20 over which sleeve 22 is located whereby to lock the outer sleeve relative to the hose and fitting. Preferably, forward end portion 36 is outwardly flared and extends to a point equal to or forwardly of crest 32 between frusto-conical end portions 28 and 30 when the outer sleeve is locked to the hose, the extended portion (or overhang) assisting in the inward insertion of the hose end portion, the positioning of the sleeve, or in supporting the hose in situations where the hose is bent adjacent the fitting end. Preferably sleeve 22 is made from some material that has band strength and resists diametric expansion during the life of the attachment, such as steel, brass or an oriented organic fiber material.

In accordance with this invention, it has been found that the double included angle "B" for the exterior frusto-conical surface portion on fitting, and "D" for the interior surface of outer sleeve 22 are very important to achieving the unexpected results that improve the reliability of the attachment to an extent that it is commercially desirable. Specifically the double included angles "B" and "D" of these frusto-conical surfaces should be nearly matched, and preferably be between one degree and eight degrees (i.e., a taper angle of about ½ degree to less than 5 degrees per side). These small double included angles "B" and "D" result in a tremendous "mechanical advantage" wherein forces applied to sleeve 22, to "drive" the sleeve towards the largest diameter at crest 32 and into engagement with conduit 10, are multiplied many times to result in extremely high capturing or clamping forces being applied to conduit 10. Surprisingly so, the small conical angles result in relatively small discontinuities in the conical surfaces of fitting 20 and sleeve 22 which contact the surfaces 12 and 14 of conduit 10 requiring a much larger force being applied in order to disrupt the secured relationship of conduit 10, fitting 20 and sleeve 22.

There are situations with constructions of conduit 10 where it is very difficult to expand the diameter of conduit 10. In order that conduit 10 be hand assembled over the largest diameter of fitting 20 at the area where the reverse taper portion 28 meets the lead on portion 30, it is necessary to limit this largest diameter. To gain extra retention it is convenient to slightly reduce the free diameter of conduit 10 at the root or smallest diameter of reverse taper area 28. In every case since the surface area of portion 28 is tapered, there will be a smallest and largest diameter. The wall thickness of conduit 10 will be slightly less at the largest fitting diameter than it would be at the smallest diameter of portion 28. Since the largest "footprint", that is the surface area of conduit 10 captured between fitting 20 and outer sleeve 22, is desirable in order that stresses on the material of conduit 10 be minimized by having the capturing force distributed over a large area, it is necessary that double included angle of the outer sleeve be somewhat less than the double included angle of the fitting. This difference is dictated by the variation in thickness of conduit 10. It is possible to make a workable attachment using angle "B" equal to or even slightly less than angle "D", because of the unusually tolerant situation that is achieved when angles between one and four degrees are used, but best results are obtained from a longevity standpoint by minimizing the stresses on the material of conduit 10.

It will be found to be advantageous to dimension sleeve 22 in a manner such that in the maximum tolerance condition where the dimensions are such that the sleeve 22 moves at the least an amount over lead on portion 30, and that sleeve 22 contact area with the conduit 10 be positioned so as to be in contact with the conduit 10 at the area of greatest diameter of fitting 20. Secondary locking means serve to assure that the positional relationship of conduit 10 relative to fitting 20 and sleeve 22 is secured throughout the service life of the attachment. Generally, as the hose tends to be pulled off the biconical fitting, the outer sleeve follows the hose to further tighten the joint. The lock between the hose and sleeve could in some applications be limited to the small half of the sleeve and operable directly on the outer portion of the hose (or outer portion of an intermediate element positioned between the exterior of the hose and the interior of the sleeve) so that the stresses imposed have a minimal effect on the stresses involved in sealing and retention.

In the embodiments shown in FIGS. 2–12 the respective sleeve and fittings use the same matched angles "B" and "D" to achieve the same result. Elements that are the same as previously described will be marked with the same reference number. The embodiments to be discussed will respond to surface shape and conditions that are common to various conduits 10, and the use of a separate sealing means to seal the conduit to fitting 20 which is used in conjunction with the attaching means. For example, an interposed seal is necessary when the inner surface of the conduit is not smooth enough to make an adequate seal.

Figure 2:
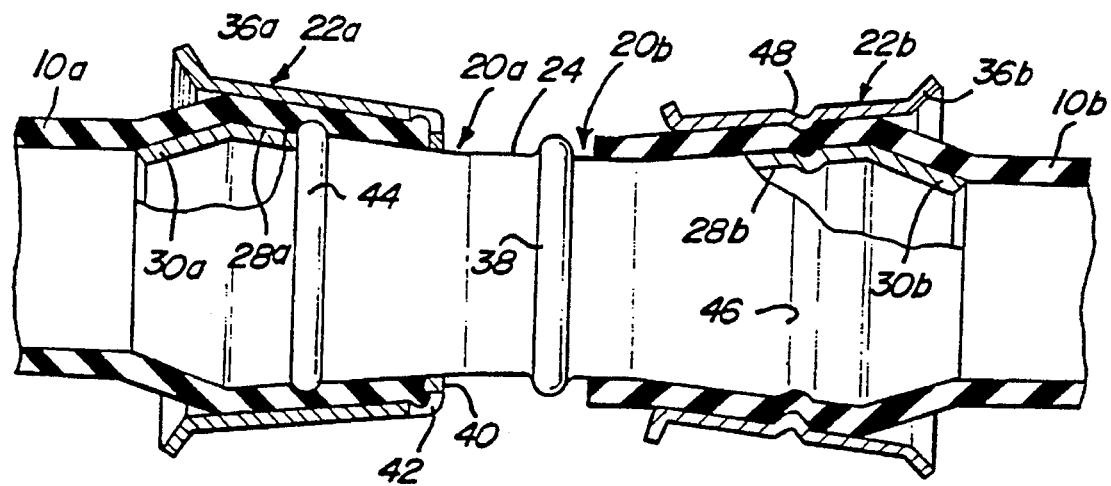
FIG. 2 is side elevation view, partially in section, of an alternate embodiment of a fluid-tight coupling according to this invention wherein a biconical fitting is used to terminate oppositely extending hoses.
Figure 2A:
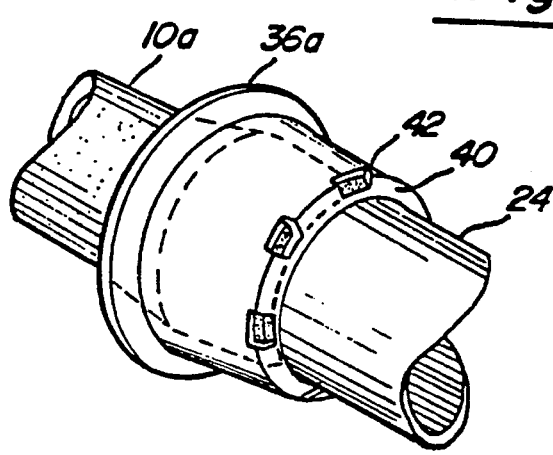
FIGS. 2A and 2B provide detail of the left end hose coupling shown in FIG. 2.
Figure 2B:
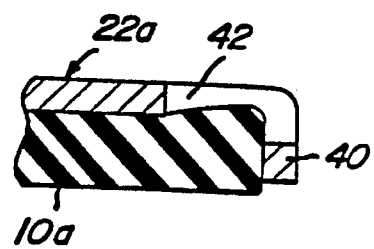

FIG. 2, 2A and 2B show a hose coupling wherein both ends of cylindrical body member 24 will be used to receive, each, a hose 10a and 10b, the body member having a cylindrical annulus 38 which defines a stop. Each end of body member 24, designated with the letters "a" and "b", respectively, when considering the left or right and extending end, is provided with a biconical portion 26a and 26b including first and second end portions 28a and 30a and 28b and 30b, respectively, to receive one respective hose 10a and 10b. A frusto-conical clamping member or lock sleeve 22a and 22b is located about the respective hose end portion and end portion 28a and 28b. The respective inner surfaces of sleeves 22a and 22b and exterior surfaces of conical end portions 28a and 28b clampingly grip the respective hose 10a and 10b end portion. The frusto-conical angles "B" that describe exterior surfaces of end portions 28a and 28b and "D" that describe interior surfaces of sleeves 22a and 22b would be defined by the double included angle of between 1° and 8° relative to center axis "A".

Sleeve 22a would be manufactured with a flange 40 partially turned inward, flange 40 being bent radially inward to allow sleeve 22a to be loosely attached to fitting 20a. Sleeve 22a is located onto fitting 22a prior to pushing conduit 10a up over fitting 22a. By making flange 40 so that conduit 10a is not stopped by sleeve 22a as it is pushed onto fitting 20a, conduit 10a will merely centralize sleeve 22a as conduit 10a is pushed on. After assembly of sleeve 22a over fitting 20a, the inward forming of flange 40 would be completed. This would then loosely secure sleeve 22a to fitting 20a, so that the resulting assembly would be ready to use in the field. The flared portion 36a and 36b would be provided on sleeves 22a and 22b.

Means of assuring the positioning of the parts throughout the life of the attachment include provision of a slot 42 at the turned in transition of flange 40, slot 42 providing an area where the material of conduit 10a can bulge up into the slot 42 after the distortion of conduit 10a that results from locking or "setting" sleeve 22a to effect the attachment of conduit 10a to fitting 20a. Because of the large "footprint" (previously defined) of sleeve 22a, and the special angles "B" and "D", very large compressive forces are developed on conduit 10a, but only a small distortion of conduit results. Because of the special small angles "B" and "D" however, very little material is required in shear (the bulged up portion of the material of conduit 10a) to effect a very robust locking of the position of sleeve 22a on conduit 10a.

Means to lock conduit 10a to fitting 20a include provision of one or more raised portions on the surface of the reverse taper portion 28a of fitting 20a. As shown, a raised area 44 to secure the position of conduit 10a on fitting 20a is located from the minimum diameter area of fitting 20a. Note also, that very little deformation of the material of conduit 10a would be used so that stresses on conduit 10a would be minimized. Small "pinched up ears" on the surface of fitting 20a which would in effect be small segments of raised area 44 are effective. The advantage of this treatment is that the "pinching" operation on the fitting 20a results in small pockets adjacent to the "ears". The material of the conduit 10a may thus be distorted into these pockets when displaced by the ears. This greatly reduces the force required to cause this distortion, and makes "setting" sleeve 22a easier and with less variability. The section extending to the right of body member 24 shows includes an annular groove 46 which acts very much like the slot 42 and sleeve 22b includes a raised radial groove or rib 48 that acts very much like the raised area 44.

It is anticipated that in using the disclosed attaching method, that sleeves 22a and 22b will be "set" by various means. These means would include "hand setting", and setting by means of simple tooling. Some users may prefer a more visual mechanical means of setting with an easily inspectable result.

Figure 3:
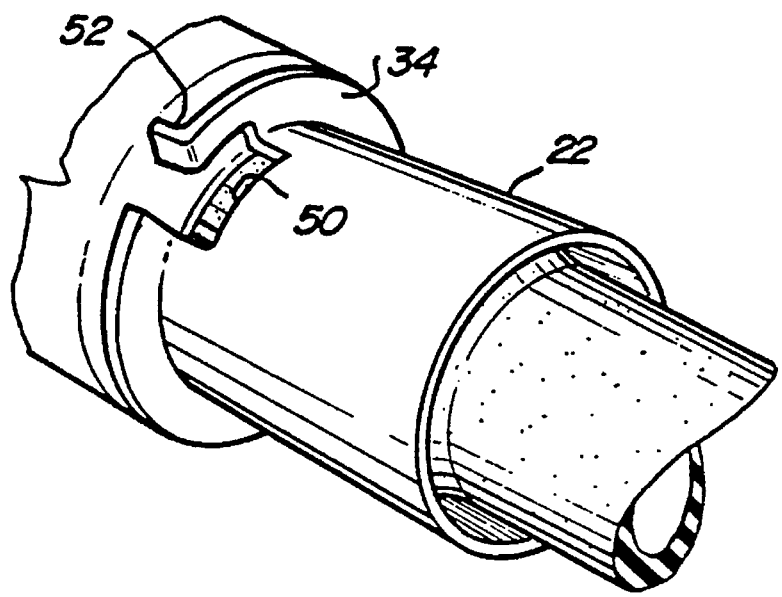
FIG. 3 is a perspective view of an alternate embodiment of a fluid-tight coupling according to this invention including an arrangement for gripping the hose.
Figure 4:
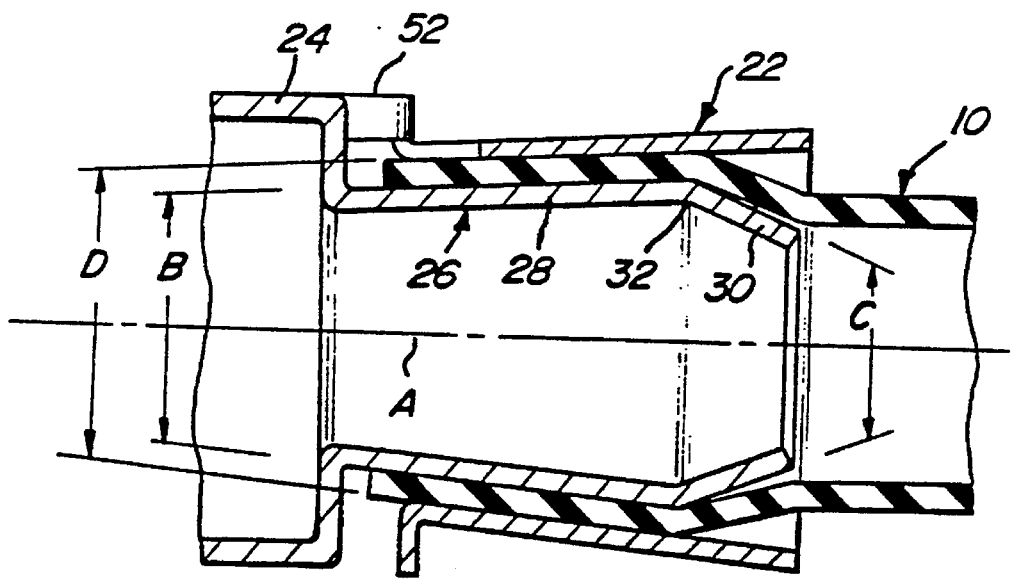
FIG. 4 is a side elevation view, in cross-section, of the coupling shown in FIG. 3.

FIGS. 3 and 4 show a fluid coupling wherein an alternate means of "setting" the sleeve are provided. Elements that are the same as previously described will be marked with the same reference number. An arcuate slot 50 (similar to slot 40 in FIG. 2) has been formed in sleeve 22 so that it frees a portion of outward radial flange 34. A flange 52 is then provided to be employed as a bendable segment which drives sleeve 22 up on to engagement to lock conduit 10 about fitting 20. Flange 52 would be bent with an appropriate tool and because of the nature of the material of sleeve 22 act to urge sleeve 22 into a "set" position. The confirmation that sleeve 22 has been "set" could then be visually accomplished by merely noting that flange 52 is in intimate contact with device 24. As before, extrusion of the hose into slot 50 assists locking of the hose relative to the coupling.

Figure 5:
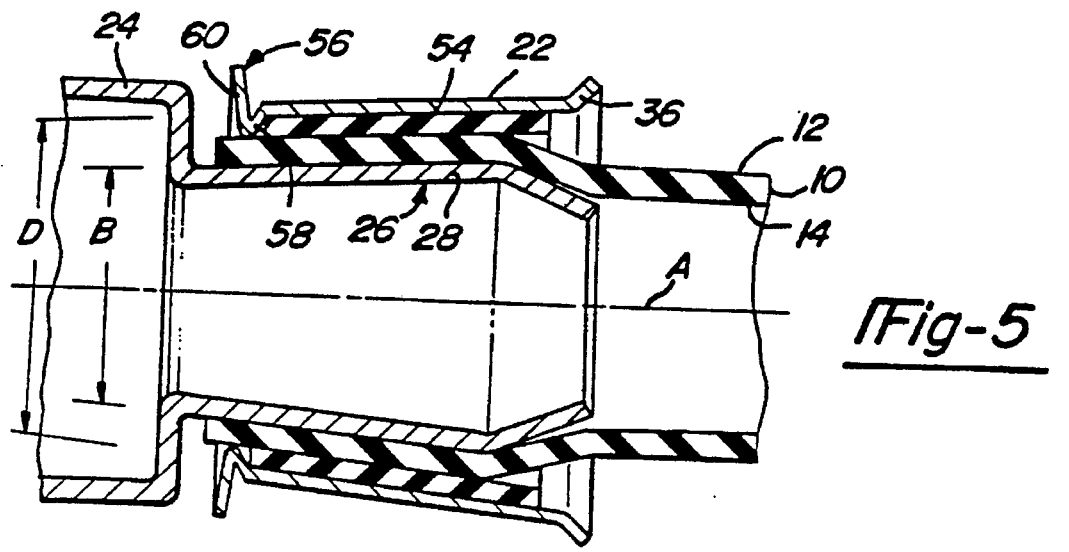
FIG. 5 is a side elevation view, in cross-section, of an alternate embodiment of a fluid-tight coupling according to this invention showing a redundant seal.

FIG. 5 shows a fluid coupling wherein conduit 10 has a rough outer surface. Elements that are the same as previously described will be marked with the same reference number. To minimize the stresses applied to conduit 10 in order to maximize its service life, a collar 54 of deformable material is sandwiched between the interior surface of sleeve 22 and exterior surface 12 of the conduit. Collar 54 distributes the forces applied by sleeve 22 to the conduit 10 more evenly, thus reducing the stresses developed in the conduit 10 from the compression forces that result from "setting" sleeve 22. The rough outer surface of conduit 10 will "lock" material 54 into position. If desired, a slot 40 or 50 may be used to lock outer sleeve 22 to the material of collar 54. Forward end of the sleeve would be flared at 36 and a reversely bent flange 56 which has a radially inward portion 58 to captivate the collar about the hose and assist its movement during locking. A radial outward portion 60 assists in driving the sleeve 22 relative to the hose. The sleeve 22, collar 54 and fitting end portion 28 would be formed at the special double angle of about 1 to 8 degrees.

Figure 6:
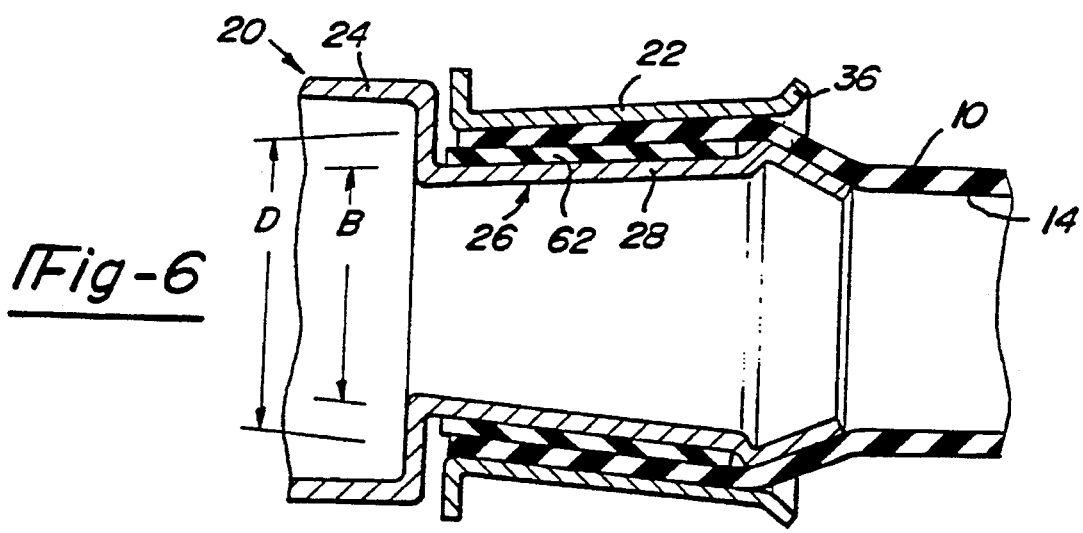
FIG. 6 is a side elevation view, in cross-section, of an alternate embodiment of a fluid-tight coupling according to this invention showing a redundant seal.

FIG. 6 shows a fluid coupling that is similar to the coupling shown in FIG. 5. Elements that are the same as previously described will be marked with the same reference number. In this embodiment the inner wall 14 of conduit 10 is not sufficiently smooth to be axially positioned, to properly seal, or to reduce the stresses in the conduit. Interposed between the hose and end portion 28 of fitting 20 is a frusto-conical band 62 comprised of a material that is more tolerant of conduit deformation, so as to functionally survive the increased useful life. Fitting 20 is formed with a outward radial portion 64 to prevent interposed band 62 from being pulled off of the fitting 30. Preferably band 62 would be preformed with the double included conical angle of about 1 to 8 degrees.

Figure 7:
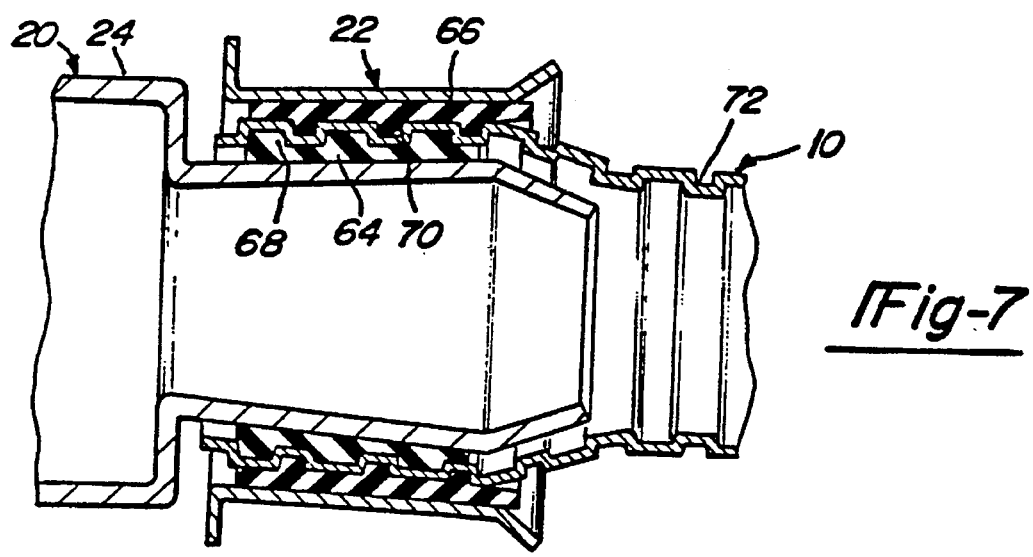
FIG. 7 is a side elevation view, in cross-section, of an alternate embodiment of a fluid-tight coupling according to this invention including redundant elastomeric sleeves which clampingly engage a corrugated hose.

FIG. 7 shows a fluid coupling embodiment disclosing a further aspect of the embodiments discussed in FIGS. 5 and 6. Elements that are the same as previously described will be marked with the same reference number.. In this embodiment conduit 10 is formed by a corrugated material that is often used for very low pressure applications, but which is not suited for the sleeve lock approaches heretofore described. Conduit 10 is interposed between shaped sleeves 64 and 66, sleeve 64 being inner and sleeve 64 being outer to the conduit, the sleeves 64, 66 being interposed between the lock sleeve 22 interior frusto-conical surface and fitting 20 exterior frusto-conical surface, the sleeves 64, 66 being conical with their double included angle being between one and eight degrees and substantially matching the inner and outer surface configuration of conduit 10. A very low stress is developed in conduit 10, which greatly extends the service life of the conduit. If the projecting portions 68 and 70, from the respective sleeves 64, 66 are helically wound, and the corrugations 72 are helically wound, each mesh together and rotation tightens the coupling.

Figure 8:
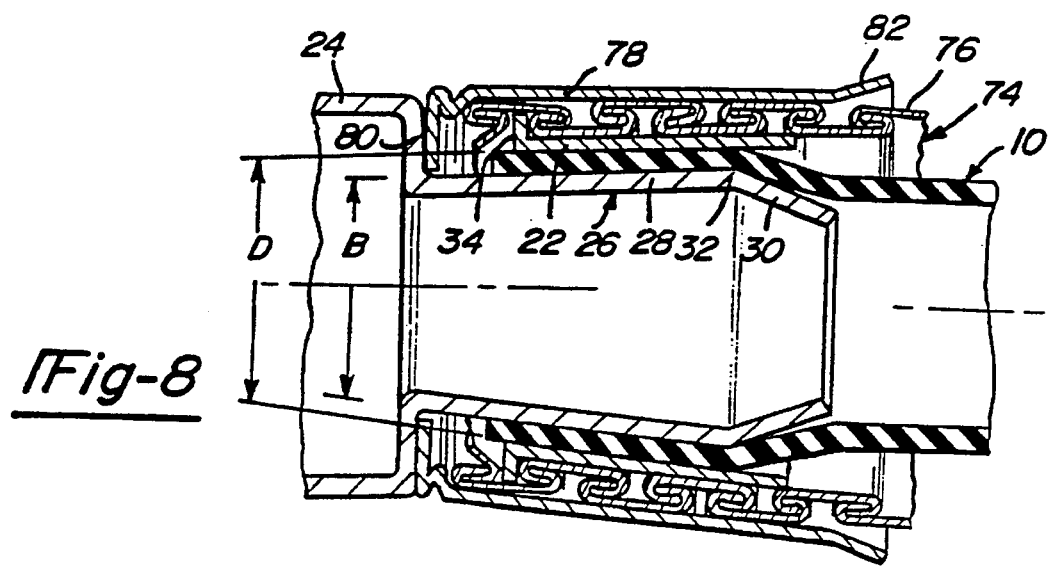
FIG. 8 is a side elevation view, in cross-section, of an alternate embodiment of a fluid-tight coupling according to this invention showing a corrugated hose.

FIG. 8 shows a "Greenfield" type conduit 74 comprising a liner conduit 10 and a rugged outer conduit 76 to provide mechanical strength in and a sealed relationship with the fitting 20 with the required mechanical integrity to be useful for high pressure applications. Conduit 74 that has been assembled over fitting 20 and into sleeve 22 and "set" or locked as previously described. Mechanical strength outer conduit 76 has been compressed back (it is spring like) during this operation. Ferrule 78, having an outward flare 82 forwardly of the crest 32 and having been first assembled over fitting 20 along with sleeve 22, is used to drive sleeve 22 into its locked position by inward flange 80 of ferrule 78 driving outer flange 34 of lock sleeve 22. The interior of outer conduit 76, being larger in diameter than the diameter of flange 34, passes over flange 34, and the end of conduit 76 drives ferrule 78 back against device 24 when it engages inward flange 80. Ferrule 78 is then crimped adaptively around the inner form presented by conduit 76, flange 34 and sleeve 22 by means of adaptive crimping die shoes that are made from some deformable material-like rubber or urethane. Ferrule 78 thus mechanically secures conduit 76, which is additionally engaged to flange 34 of sleeve 22, and further drives sleeve 22 into further engagement over inner liner conduit 10 to additionally secure and seal conduit liner 10 to fitting 20. Note that now inner conduit liner 10 is no longer required to withstand the blow-out forces of high pressure or temperature effects that might weaken conduit 10, since a slight expansion of conduit 10 is immediately limited by the very strong and temperature resistant outer conduit 76. Outer conduit 76 would be manufactured from metal (as an example of a suitable material) and thus inner conduit 10 maybe made from a material-like plastic that does not have the mechanical properties at high temperatures that are necessary for the outer conduit 76, and the required high pressure and temperature performance. The combination of conduits will thus operate at temperatures in excess of the capability of conduit 10 alone.

Figure 9:
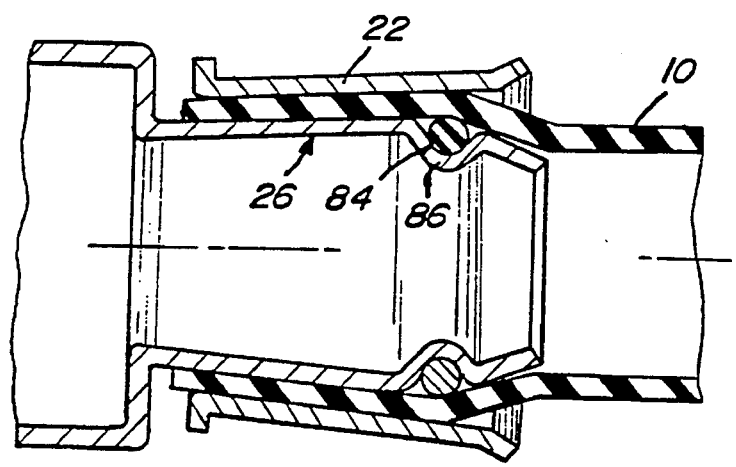
FIG. 9 is a side elevation view, in cross-section, of an alternate embodiment of a fluid-tight coupling according to this invention showing a redundant seal.
Figure 10:
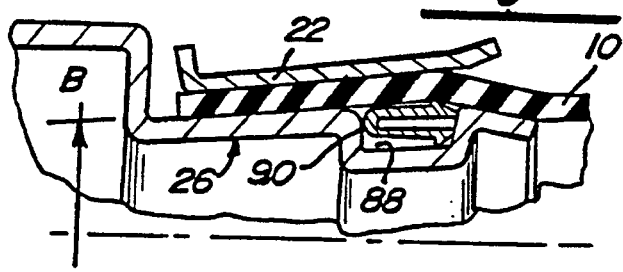
FIG. 10 is a side elevation view, in cross-section, of an alternate embodiment of a fluid-tight coupling according to this invention showing a low pressure cup seal.

FIGS. 9 and 10 are for situations wherein the redundant sealing capability would comprise a "dynamic" type seal which exerts more sealing pressure in response to an increase in pressure. In accordance with this invention the dynamic seal would be placed forward of the static seal, such as described in the preceding embodiments. A benefit of the forward location, in conjunction with the sleeve lock-type attachment, is that less "penalty" in interior diameter through the attachment is encountered. The forward attachment will offer an improved (static) compression seal which will easily out perform in time the known static compression seals that are used because of "large footprint" and low deformation percentage, but will also offer the added benefits to be derived from the use of a dynamic seal. There is a definite need to be able to get extended service life, and to be able to safely employ the otherwise superior plastic piping that is available today.

FIG. 9 shows a fluid coupling wherein fitting 20 has near its hose receiving terminus an inward radial recessed channel 86 sized to receive therein elastomeric seal 84. The depth of the channel is such that seal 84 projects above the periphery of the fitting end portions 28 and 30. The seal is shown as an O-ring, and acts as an additional seal to seal the hose against the fitting end portions.

FIG. 10 is a fluid coupling useful in situations where extremely low pressures are to be confined for periods of time that are long compared to the creep properties of an elastomeric O-ring similar to that shown in FIG. 9. The coupling includes an inward radial recessed channel 88 shaped to receive a "U" cup or "lip" type seal 90 comprised of metal. U-shaped seal 56 better utilizes the confined pressure to develop seal contact force.

Figure 11:
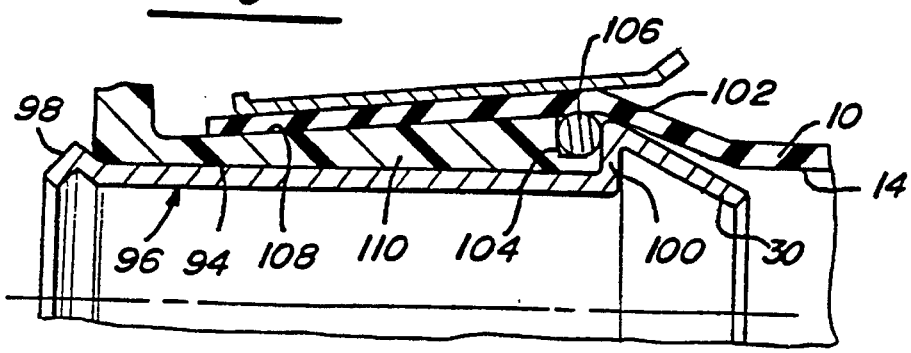
FIG. 11 is a side elevation view, in section, of an alternate embodiment of a fluid-tight coupling according to this invention, showing the incorporation of a seal between the fitting end and conduit interior, and means for strengthening the fitting end.

FIG. 11 shows a fluid coupling wherein the fitting is modified to include a nipple 92 formed of plastic having an axial bore 94 therethrough and a metal sleeve 96 positioned within the bore. Outward radial flanges 98 and 100 from the sleeve serve to couple the sleeve 96 to the nipple such that the bore wall fits snugly about the nipple. An annular groove 102 is formed between a step 104 in the nipple and raised flange 100 on the sleeve, the groove sized to receive an elastomeric O-ring 106 that projects about the periphery 108 of the nipple to be in contact with the inner wall 14 of hose 10. The nipple and sleeve are manufactured as a portion of device 24. Sleeve 22 operates as previously described, and embodiments shown in other figures might also be employed here, as they might be with any of the other embodiments shown in the various figures. The purpose of fitting end portion 30 is to provide a lead area 34, allow O-ring groove to be easily provided in manufacture, and to strengthen tapered central portion 110 of the fitting sleeve. One would select metal as the material for sleeve 96 if device 24 were made from a material which would not resist the compressive forces (applied by sleeve 22) over a long period of time for example. Conversely, if the material of device 24 were metal which would have the desired strength, then sleeve 96 portion might be made of plastic.

Figure 12A:
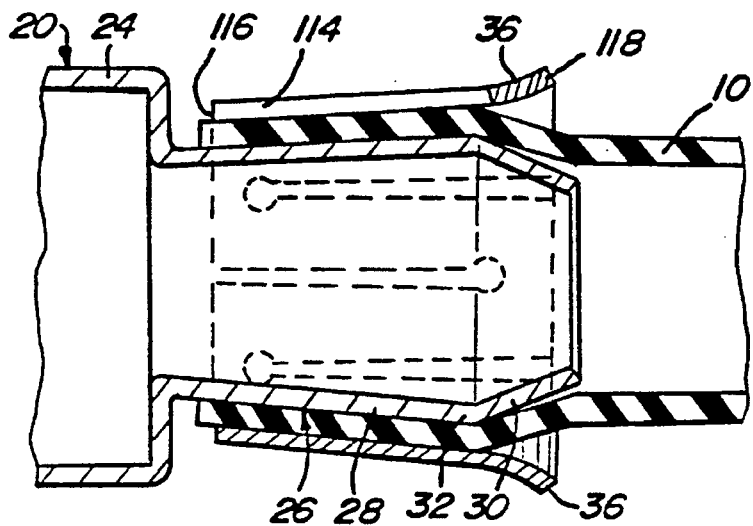
FIG. 12A is a side elevation view, in cross-section, of an alternate embodiment of a fluid-tight coupling according to this invention, showing a serpentine-shaped sleeve clamped about the fitting.
Figure 12B:
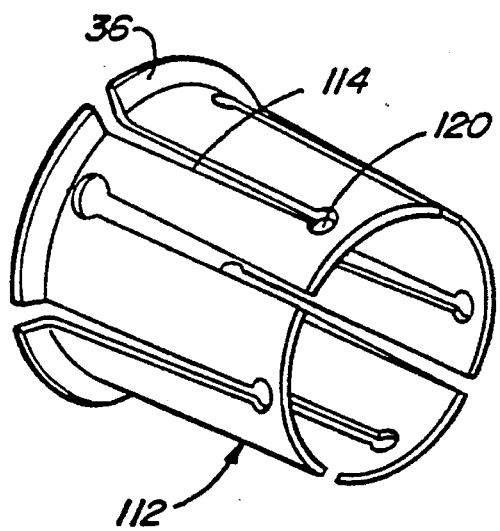
FIG. 12B is a perspective view of the serpentine-shaped sleeve shown in FIG. 12A.

FIGS. 12 and 12A show a coupling similar to FIG. 1 wherein a serpentine formed frusto-conical sleeve 112 is disposed about the fitting. Sleeve 112 is generally stamped from a flat sheet of metal stock with axial slots 114 extending inwardly from opposite edges 116 and 118 of the sheet but end short of the opposing edge. The slot radial widths are suitably dimensioned to allow the sheet to be rolled into a frusto-conical shape, whereupon the adjoined edges are joined. Resiliency of the cone to accommodate rough surfaced hose and could be provided by keyhole 120 enlargements at the root of one or more of the slots. End 36 is overhung beyond crest 32 connecting frusto-conical end portions 28 and 30. The interior and exterior surfaces of the sleeve 112 and fitting 20 are provided with the special double included conical angle of 1 to 8 degrees.

From the foregoing figures and explanations, it is seen that the sleeve lock concept is adaptable to many variations of conduits. The sleeve lock concept is commercially viable because of the recognition that there is a small range of angles, that when used, provide a dramatic improvement in retention and sealing that make a commercially reliable, and therefore acceptable device possible. The inherent low cost of the reverse taper locking means has made such a device be recognized as potentially commercially attractive for years, but previous attempts to provide such a device always failed because those who were attempting to develop and market such a device failed to comprehend the special small range of angles, that make such devices commercially acceptable, is a necessary precedent to achieving that goal.

While the above description constitutes the preferred embodiment of the invention, it will be appreciated that the invention is susceptible to modification, variation, and change without departing from the proper scope or fair meaning of the accompanying claims.

What I claim is:

1. A hose coupling for terminating the end of a deformable hose or tubular member, comprising a fitting having an end adapted to be received interiorly of said hose and to expand the interior diameter of said hose when inserted therein, said fitting end having a smooth uninterrupted external surface to contact with the interior surface of said hose, a biconical shape with a first and second portion generally frusto-conical shaped and intersecting at a crest defining a largest diameter portion of said fitting for expanding said hose, and a locking sleeve having a smooth uninterrupted internal surface to contact with said hose, said locking sleeve locatable over said hose whereby to clampingly secure the hose between the fitting and sleeve, means for setting said outer sleeve with said conduit and fitting, said setting means axially extending from and coupled with said sleeve, said fitting and sleeve are constructed such that a portion of each is formed with a matching frusto-conical surface defined by a double included angle of one to eight degrees the conical surfaces increasing in diameter toward the inserting end of said fitting, said double included angle of said sleeve being less than the double included angle of said fitting, and said sleeve and fitting retaining, sealing and positioning said hose between said sleeve and fitting.

2. The hose coupling as set forth in claim 1, further characterized by non-threaded means provided between said locking sleeve and fitting for locking said sleeve to the exterior of said hose.

3. The hose coupling as set forth in claim 1 wherein the hose includes a thread-like shape and including means interior to said locking sleeve and having a thread-like shape, for interengaging with the thread on the hose.

4. The hose coupling as set forth in claim 3, wherein said locking sleeve extends axially beyond the largest diameter of said fitting.

5. The hose coupling as set forth in claim 3, wherein said fitting includes a second frusto-conical portion at the end thereof, said second frusto-conical portion being beyond the largest diameter of the first portion thereof and having a diameter which is smaller than the largest diameter of said fitting.

6. The hose coupling as set forth in claim 5, wherein said smaller diameter is less than the inside diameter of said hose.

7. The hose coupling as set forth in claim 1, wherein said locking sleeve extends axially beyond the largest diameter of said fitting.

8. The hose coupling as set forth in claim 1, wherein said fitting includes a second frusto-conical portion at the end thereof, said second frusto conical portion being beyond the largest diameter of the first portion thereof and having a diameter which is smaller than the largest diameter of said fitting.

9. The hose coupling as set forth in claim 8, wherein said smaller diameter is less than the inside diameter of said hose.

10. The hose coupling as set forth in claim 1, wherein said setting means includes a radially outwardly directed flange portion.

11. The hose coupling as set forth in claim 10 and said flange portion including a bent portion for setting said sleeve with said fitting.

* * * * *

UNITED STATES PATENT AND TRADEMARK OFFICE
CERTIFICATE OF CORRECTION

PATENT NO. : 5,582,436

DATED : December 10, 1996

INVENTOR(S) : Donald D. Bartholomew

It is certified that error appears in the above-indentified patent and that said Letters Patent is hereby corrected as shown below:

Col. 2, line 17, "axis." should be --axis--

Col. 2, line 18, "angle.)" should be --angle).--

Col. 2, line 24, delete "of"

Col. 4, line 37, delete first occurrence of "the"

Col. 4, line 66, "fitting" should be --fitting 20--

Col. 6, line 6, "FIG." should be --FIGS.--

Col. 6, line 11, delete "and"

Col. 7, line 1, delete "shows"

Col. 7, line 64, "number.." should be --number.--

Col. 8, line 2, second occurrence of "sleeve 64" should be --sleeve 66--

Col. 8, line 18, delete "that"

Signed and Sealed this

Tenth Day of June, 1997

Attest:

BRUCE LEHMAN

Attesting Officer

Commissioner of Patents and Trademarks